US007218801B2

(12) United States Patent
Chambelin et al.

(10) Patent No.: US 7,218,801 B2
(45) Date of Patent: May 15, 2007

(54) WAVEGUIDE FREQUENCY-BAND/POLARIZATION SPLITTER

(75) Inventors: Philippe Chambelin, Chateaugiron (FR); Ali Louzir, Rennes (FR); Henri Fourdeux, Corps-Nuds (FR)

(73) Assignee: Thomson Licensing, Boulogne-Billancourt (FR)

( * ) Notice: Subject to any disclaimer, the term of this patent is extended or adjusted under 35 U.S.C. 154(b) by 51 days.

(21) Appl. No.: 10/549,826

(22) PCT Filed: Mar. 16, 2004

(86) PCT No.: PCT/EP2004/050313

§ 371 (c)(1), (2), (4) Date: Sep. 20, 2005

(87) PCT Pub. No.: WO2004/084337

PCT Pub. Date: Sep. 30, 2004

(65) Prior Publication Data

US 2006/0232360 A1 Oct. 19, 2006

(30) Foreign Application Priority Data

Mar. 20, 2003 (FR) .................................. 03 03583

(51) Int. Cl.

| | |
|---|---|
| ***G02B 6/00*** | (2006.01) |
| ***G02B 6/12*** | (2006.01) |
| ***G02B 6/10*** | (2006.01) |

(52) U.S. Cl. ......................... 385/11; 385/14; 385/129; 385/130; 385/131

(58) Field of Classification Search .................. 385/11
See application file for complete search history.

(56) References Cited

U.S. PATENT DOCUMENTS

| | | | |
|---|---|---|---|
| 3,777,286 | A | 12/1973 | Cramm et al. |
| 5,256,990 | A | 10/1993 | Young |

FOREIGN PATENT DOCUMENTS

| | | |
|---|---|---|
| EP | 1296404 | 3/2003 |
| FR | 2135116 | 12/1972 |

OTHER PUBLICATIONS

Search Report dated May 28, 2004.

*Primary Examiner*—Frank G. Font
*Assistant Examiner*—Mary El-Shammaa
(74) *Attorney, Agent, or Firm*—Joseph J. Laks; Robert D. Shedd; Brian J. Cromarty

(57) ABSTRACT

The invention proposes an optimized solution of a frequency/polarization splifter that requires no adjustment after production and can be produced entirely by moulding. The polarized-wave splitter comprises various components, including a polarization splitter 1 coupled to two filters 3 and 5 via transition regions 2 and 4. The overall dimensions of the various components are such that the transfer characteristics of the splitter are better than the characteristics resulting from the sum of the characteristics of the components constituting the splitter.

3 Claims, 3 Drawing Sheets

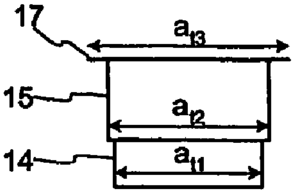
FIG.3c
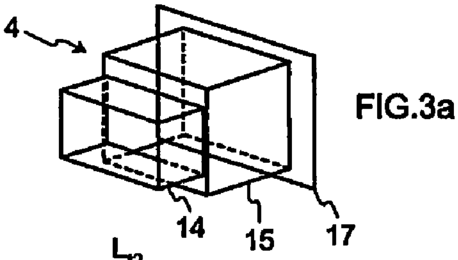
FIG.3a
FIG.3b
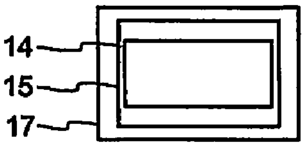
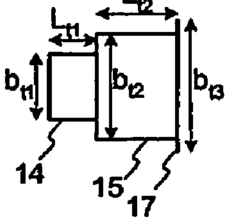
FIG.3d
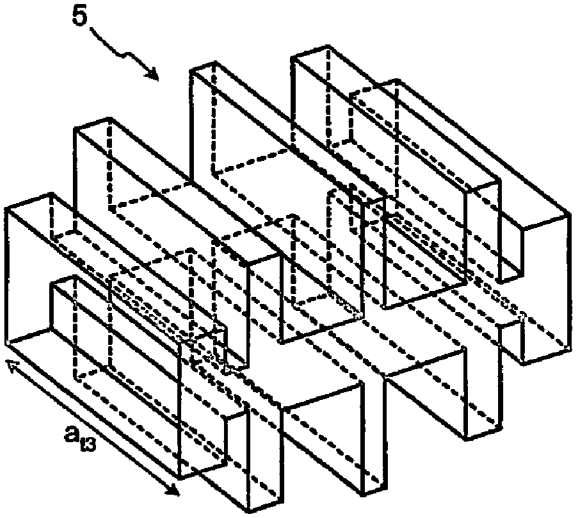
FIG.4a
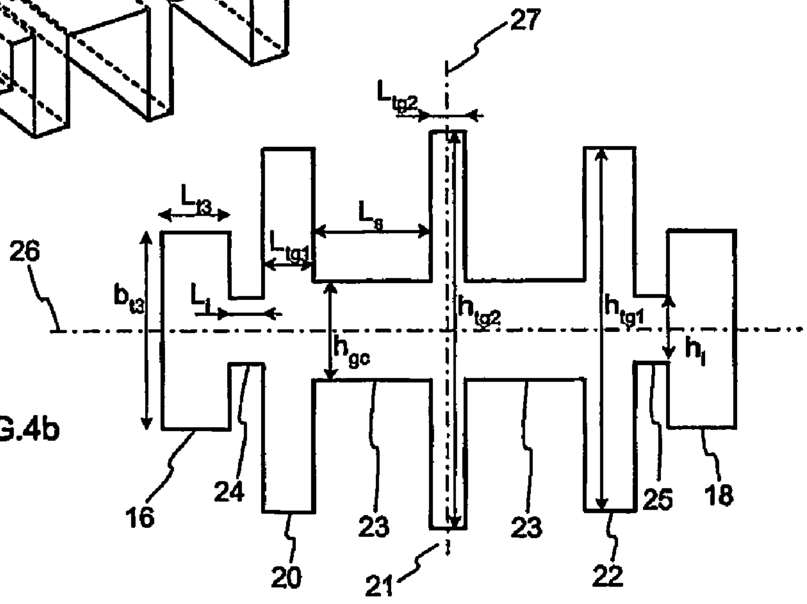
FIG.4b

WAVEGUIDE FREQUENCY-BAND/POLARIZATION SPLITTER

The invention relates to a waveguide frequency-band/polarization splitter. More particularly, the invention relates to a linear-polarization splitter that includes waveguide filtering functions in order to split the transmitted waves and the received waves.

Two-way satellite transmissions use different transmit and receive frequency bands. It is known to use different transmit and receive polarizations. Moreover, when a frequency band is allocated, in order to meet high frequency and polarization separation constraints, it is known to use a waveguide technology. Hitherto, this type of device has not been produced on a large scale and each component is relatively expensive to produce.

At the present time, a compact high-performance splitter that can be mass produced for a low cost does not exist.

The invention proposes an optimized solution of a polarization/frequency splitter that requires no adjustment after production and can be produced entirely by moulding.

The invention is a polarized-wave splitter comprising various components. At least one common waveguide has a cross section suitable for letting at least two different polarizations propagate, the common waveguide having first and second ends, the first end constituting a common input/output. A first slot is placed at the second end of the common waveguide, the first slot letting waves propagate with a first polarization. A second slot is placed on a lateral part of the common waveguide, the second slot letting waves propagate with a second polarization. A first transition region provides a change in waveguide cross section. A second transition region provides a change in waveguide cross section. A first waveguide filter has a first end connected to the first slot via the first transition region, and a second end constituting a first individual input/output. A second waveguide filter has a first end connected to the second slot via the second transition region, and a second end constituting a second individual input/output. The overall dimensions of the various components are such that the transfer characteristics of the splitter, within a transmit band and within a receive band, measured, on the one hand, between the common input/output and the first individual input/output and, on the other hand, between the common input/output and the second individual input/output, are better than the characteristics resulting from the sum of the characteristics of the components constituting the splitter, within the said bands.

Figure 1:
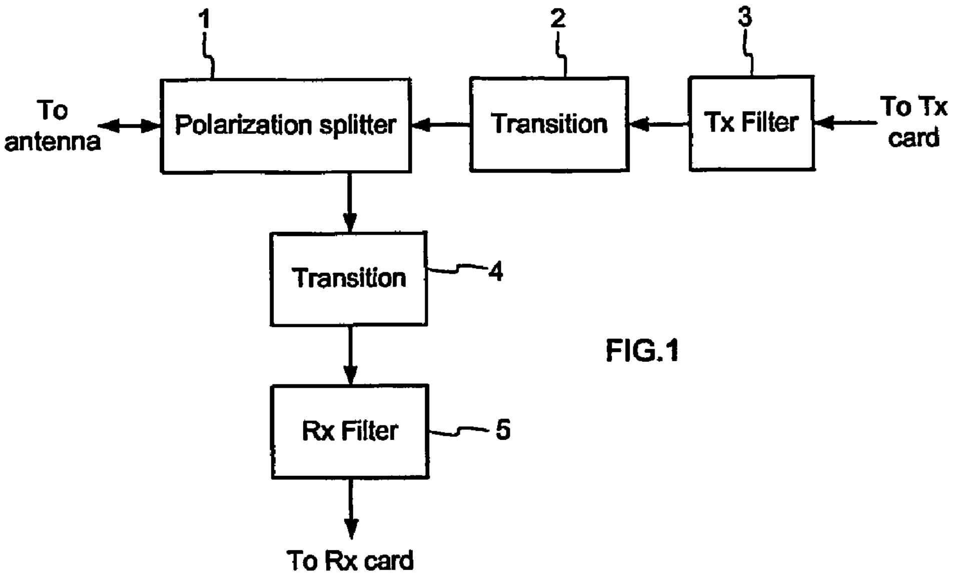

The invention will be more clearly understood and other features and advantages will become apparent on reading the description that follows, the description making reference to the appended drawings in which:

FIG. 1 shows the block diagram of the splitter according to the invention; and FIGS. 2 to 5 show the four components that constitute the splitter according to the invention.

FIG. 1 shows the block diagram of the splitter according to the invention. The splitter comprises a common port (or common input/output) that is connected to a waveguide antenna component, such as a horn for example, and two individual ports (or individual inputs/outputs) that are connected, on the one hand, to a transmit circuit and, on the other hand, to a receive circuit. The arrows indicated in FIG. 1 merely have the purpose of indicating the direction of travel of the waves for a given transmit or receive configuration. The direction of the arrows may be reversed without any other modification of the splitter, provided that the transmit and receive circuits (and bands) are reversed. A polarization splitter 1 connected to the common port splits the waves coming from the antenna into two groups of waves having two different polarizations, in this case two linear and mutually perpendicular polarizations. A first transition region 2 is connected to the polarization splitter 1 in order to transmit (or receive) waves with a first polarization that come from a first end of a first filter 3. A second end of the filter 3 constitutes the first individual port. A second transition region 4 is connected to the polarization splitter 1 in order to receive (or transmit) waves with a second polarization and deliver them to a first end of a second filter 5. A second end of the second filter 5 constitutes the second individual port.

One conventional approach with this type of device consists in choosing and dimensioning the various components individually and to join them together using a waveguide portion of constant cross section and having a length of at least λg/2, where λg is the wavelength specific to the waveguide, in such a way that the various components do not mutually interfere. The transfer characteristics of the whole assembly are then slightly inferior to the sum of the characteristics of the components taken individually. "Sum" should be understood to mean the combination of the characteristics, which is not a mathematical sum but rather the result of a product of matrices. The various components must therefore be individually of very high performance so that the resulting assembly corresponds to the desired performance.

According to the invention, the approach of dimensioning the various components is performed in an overall manner. Firstly, it is necessary to define what performance levels, in terms of characteristics, are desired. As an example, it may be desired to produce a splitter that operates in transmit mode within a frequency band between 29.5 and 30 GHz and, in receive mode, within a frequency band between 19.7 and 20.2 GHz. It may be desired to have a reflection coefficient of less than −30 dB for each of the ports, a transmission factor of greater than −0.8 dB between the common port and the first individual port with the first polarization and in the transmit band, a transmission factor of greater than −0.8 dB between the common port and the second individual port with the second polarization and in the receive band, and a transmission factor of less than −30 dB between the common port and the second individual port with the first polarization and in the transmit band, a transmission factor of less than −30 dB between the common port and the first individual port with the second polarization and in the receive band, and a transmission factor of less than −60 dB between the first individual port and the second individual port, whatever the polarization.

Next, technical choices based on the prior art are made. The polarization splitter 1 is, for example, a waveguide of square cross section having a lateral slot and a slot at one end. As known from the prior art, the use of a slot requires impedance matching, which is carried out using steps that produce waveguide/waveguide transitions 2 and 4. The filters 3 and 5 are, for example, waveguide filters having poles, produced using waveguide E-plane stubs.

Optimization starts from the principle that parasitic resonance, of capacitive or inductive type, associated with the various components can be introduced so as to favourably interact with the polarization splitter. The optimization then allows a saving of material to be made since the stubs used for linking become unnecessary.

The starting point of the optimization corresponds to a standard dimensioning operation. The polarizaton splitter 1 is produced as a square waveguide using slot coupling according to the rules of the art and covering precisely the Tx (transmit) and Rx (receive) bands with the best possible performance.

Figure 2A:
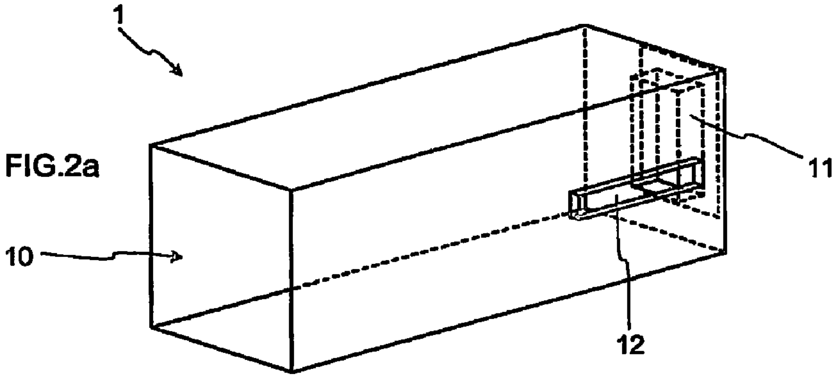
Figure 2B:
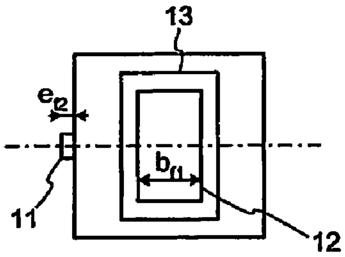
Figure 2C:
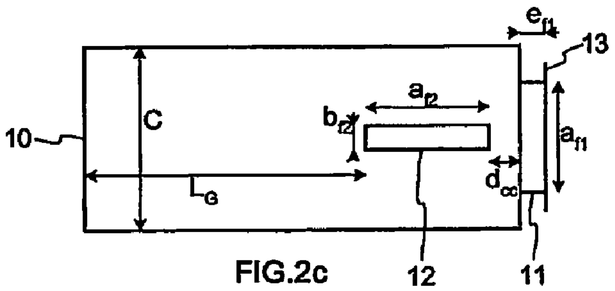

FIG. 2 shows a polarization splitter in perspective (FIG. 2*a*) and in two side views at two different angles (FIGS. 2*b* and 2*c*). For the sake of legibility of this FIG. 2 and the following figures, only the active wall of the components will be shown. However, FIG. 2 and the other figures correspond to the components resulting from the optimization, and a few details will be explained as we go along.

The polarization splitter 1 is a stub of square cross section, with sides C, one end 10 of which constitutes the common port, the other end being blanked off and pierced by a first slot 11 of length $a_{f1}$, width $b_{f1}$ and thickness $e_{f1}$. A second slot 12 is placed on one side of the stub at a distance $d_{cc}$ from the blanked-off end of the stub so that the waveguide terminates in to a short circuit at the centre of the slot for the wavelength of the guided wave. The second slot 12 has a length $a_{f2}$, a width $b_{f2}$ and a thickness $e_{f2}$. The waveguide length separating the end 10 from the slot is $L_G$.

The choice of dimensions of the square waveguide depends on the cutoff frequency in the Rx band—it is necessary that the fundamental mode be propagative—and on the number of modes of higher order in the Tx band. In addition, it is necessary to have the smallest possible variation in the wavelength of the guided wave, which makes matching within the band easier. The latter condition means taking a waveguide whose dimensions are approximately 20% larger than the dimensions of the waveguide at the cut-off for the Rx band.

In the present case, a waveguide having a large side of 7.7 mm gives a cut-off frequency of 19.5 GHz; a dimension at least 20% larger, but less than 10 mm, is chosen since the $TE_{20}$ mode then has a cut-off frequency of 30 GHz. Our choice is therefore C=9.6 mm.

The dimensions of the slots are such that: $a_f > \lambda_m/2$, $a_f/b_f > a/b$, and $b_f$ is very small, $\lambda_m$ being the mean wavelength of the band to be transmitted, $a_f$ being the length of the slot, $b_f$ being the width of the slot, and a and b representing the length and width, respectively, of a standard waveguide within the frequency band in question, such that only the fundamental mode $TE_{10}$ can propagate. The equivalent circuit of such a slot at resonance is given by the parallel LC equivalent circuit. By progressively increasing $b_f$, the resonance condition means that $a_f$ must increase at the same time. Thus, from the known equivalent circuit diagram of the slot, C decreases and L increases, thereby producing the quality factor Q of the resonant slot (Q is proportional to the square root of C/L) and therefore an increase in its bandwidth. This increase in bandwidth is to the detriment of the matching.

The thickness of the slots must in theory be as small as possible so as to have the best coupling, however from the mechanical standpoint it must be at least the thickness of the waveguide. The thickness of the slots is therefore chosen to be $e_{f1}=e_{f2}=0.5$ mm. The thickness of the slot has an influence on the coupling selectivity; this is because the behaviour is no longer solely resonant and a propagative effect starts to form. This immediately reduces the selectivity. The first dimensioning operation carried out according to the rules of the art results in:

| | |
|---|---|
| $a_{f1}$ = 4.77 mm | $b_{f1}$ = 1.96 mm |
| $a_{f2}$ = 7.5 mm | $b_{f2}$ = 0.66 mm |
| $L_G = \lambda g$ = 15 mm | $d_{cc} = \lambda g/4$ = 3.75 mm. |

Because of the thickness of the slots, a waveguide effect occurs. It is for this reason that, in order to improve the matching, it is necessary to use transitions in quarter-wave steps.

These transitions were dimensioned using the well-known quarter-wave matching technique, such as, for example, that indicated in “Waveguide components for antenna feed systems: Theory and CAD” by Borneman.

There is one step for the first transition 2, corresponding to the first slot 11, and two steps for the second transition 4, corresponding to the second slot 12.

The fact of having a single step at the first slot makes it possible, during the following optimization, to merge the first slot 11 with a waveguide cross section of the first transition region 2, this transition 2 being distributed over the component corresponding to the polarization splitter 1 and over the component corresponding to the first filter 3. An earth plane 13 is added at the end of the first slot 11 so as to produce the step with the stub of the first filter that is in contact with it. However, in terms of the initial data, a transition region consisting of a first stub 5.5 mm×1.47 mm in cross section and 6 mm in length and a stub 6.6 mm×2.29 mm in cross section and 3.83 mm in length is used.

The second transition consists of three stubs, two of which are shown in FIG. 3, the third stub merging with the stub of the second filter 5. FIG. 3*a* shows the component of the second transition 4 in perspective and FIGS. 3*b*, 3*c* and 3*d* show this same component in three side views. A first stub 14 comes into contact with the polarization splitter 1. The first stub 14 has a rectangular cross section with a long side of $a_{t1}$ and a short side of $b_{t1}$ and a waveguide length of $L_{t1}$. A second stub 15 follows the first stub 14. The second stub 15 has a rectangular cross section with a long side of $a_{t2}$ and a short side of be and a waveguide length of $L_{t2}$. A third stub 16 is produced on the second filter 5, an earth plane 17 providing continuity over the component shown in FIG. 3. The third stub 16 has a rectangular cross section with a long side of $a_{t3}$ and a short side of $b_{t3}$ and a waveguide length of $L_{t3}$:

| | |
|---|---|
| $a_{t1}$ = 7.9 mm | $b_{t1}$ = 2.55 mm |
| $L_{t1}$ = 11.9 mm | $a_{t2}$ = 8.59 mm |
| $b_{t2}$ = 3.14 mm | $L_{t2}$ = 7.8 mm |
| $a_{t3}$ = 9.28 mm | $b_{t3}$ = 3.72 mm |
| $L_{t3}$ = 6.36 mm. | |

However, the slots contribute to the overall matching, and they must therefore be modified according to the quarter-wave transition juxtaposing it. An overall simulation of the entire system consisting of the polarization splitter 1 and the transitions 2 and 4 is carried out. Next, the dimensions of the slots and of the steps are adjusted so as to bring the measured characteristics back into line with the desired characteristics. The simulations and adjustments are repeated until an acceptable result is obtained.

The splitter exhibits good performance, but does not by itself ensure good rejection between the Tx and Rx bands. The filters are designed to add an attenuation that allows the desired characteristics to be achieved.

In the illustrative example, waveguide filters having poles made from stubs are chosen. The filters were synthesized using the method described in "Waveguide components for antenna feed systems: Theory and CAD" by Borneman.

The second filter 5 is represented in FIG. 4, FIG. 4*a* showing a perspective view and FIG. 4*b* showing a side view. The second filter 5 has two ends 16 and 18, which correspond to waveguides letting the Rx band propagate; as explained above, one of the ends constitutes the third stub 16 of the second transition 4. To achieve the required performance levels, a three-pole filter produced from first to third E-plane stubs 20 to 22, which is placed on a central waveguide 23, is chosen. The central waveguide is coupled to the ends by two irises 24 and 25.

Preferably, the filter is produced so as to be symmetrical with respect to the central axis 26 of the filter, in order to make it as two identical moulded half-shells. To make it easier to fit the half-shells of the filter together and to fit the filter into the frequency/polarization splitter, a filter that is symmetrical with respect to a mid-plane 27 is produced. Thus, there is no fitting direction to be respected—the irises 24 and 25 are identical and the first and third stubs 20 and 22 are also identical.

The width $a_{t3}$ of the filter remains constant over the entire length. The various components consituting the filter are therefore defined as follows:

- the first and third stubs 20 and 22 have a length $L_{tg1}$ and a height $h_{tg1}$;
- the second stub 21 has a length $L_{tg2}$ and a height $h_{tg2}$;
- the central waveguide has a height $h_{gc}$ and the separation between the stubs corresponds to a length $L_s$; and
- the irises 24 and 25 have a height $h_l$ and a length $L_l$.

A dimensioning operation according to the prior art is carried out so as to have, for example, the following starting dimensions:

| | |
|---|---|
| $L_{tg1}$ = 0.96 mm | $h_{tg1}$ = 7.34 mm |
| $L_{tg2}$ = 0.55 mm | $h_{tg2}$ = 6.49 mm |
| $h_{gc}$ = 1.45 mm | $L_s$ = 2.95 mm |
| $h_i$ = 1.03 mm | $L_i$ = 0.63 mm. |

Figure 5A:
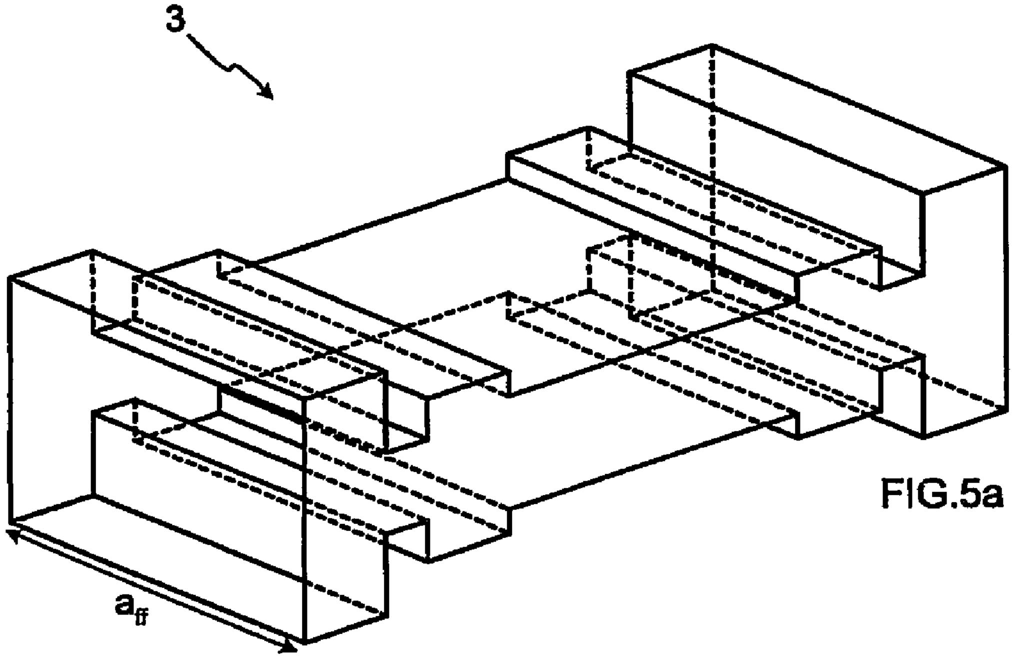
Figure 5B:
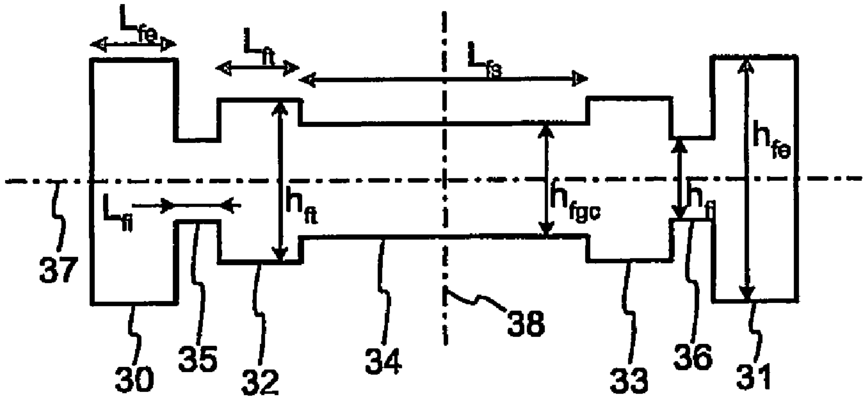

The first filter 3 is represented in FIG. 5, FIG. 5*a* showing a perspective view and FIG. 5*b* showing a side view. The first filter 3 has two ends 30 and 31 that correspond to waveguides letting the Tx band propagate—as explained above, one of the ends constitutes the second stub of the first transition 2. To achieve the required performance levels, a two-pole filter is chosen, this being produced by first and second E-plane stubs 32 and 33 connected together via a central waveguide 34. The first and second stubs 32 and 33 are coupled to the ends 30 and 31 via two irises 35 and 36.

Preferably, the filter is made so as to be symmetrical with respect to a central axis 37 of the filter so as to make it as two identically moulded half-shells. To make it easier to fit the half-shells of the filter together and to fit the filter into the frequency/polarizatlon splitter assembly, a filter is produced that is symmetrical with respect to a mid-plane 38. Thus, there is no direction of fitting to be respected—the irises 35 and 36 are identical and the first and second stubs 32 and 33 are also identical.

The width $a_{ff}$ of the filter remains constant over the entire length. The various components consituting the filter are then defined as follows:

- the ends 30 and 31 have a length $L_{fe}$ and a height $h_{fe}$;
- the first and second stubs 32 and 33 have a length $L_{ft}$ and a height $h_{ft}$;
- the central waveguide has a height $h_{fgc}$ and the separation between the stubs corresponds to a length $L_{fs}$; and
- the irises 24 and 25 have a height $h_{fl}$ and a length $L_{fl}$.

A dimensioning operation according to the prior art is carried out so as to have, for example, the following starting dimensions:

| | |
|---|---|
| $a_{ff}$ = 7.112 mm | |
| $L_{fe}$ = 5 mm | $h_{fe}$ = 3.556 mm |
| $L_{ft}$ = 2.71 mm | $h_{ft}$ = 2.13 mm |
| $h_{fgc}$ = 0.97 mm | $L_{fs}$ = 14.47 mm |
| $h_{fi}$ = 1.8 mm | $L_{fi}$ = 0.52 mm. |

The optimization is then carried out by simulating the system consisting of the polarization splitter 1, the first and second transitions 2 and 4 and the first and second filters 3 and 5. The slots 11 and 12 are then redimensioned, by increasing their lengths $a_{f1}$ and $a_{f2}$ in order to increase the bandwidth, and therefore also increasing their width $b_{f1}$ and $b_{f2}$. For each step, the H-plane discontinuity (inductive effect) and E-plane discontinuity (capacitive effect) are modified so as to have a matched overall LC circuit. The first stubs 20 and 32 (together with their symmetrical stubs 22 and 33) of the filters 3 and 5 are modified, so that the LC circuit equivalent to the first stub is matched to the transition.

The basic idea consists in introducing a mismatch into the plane of the slot in order to compensate for the mismatch of this slot, both in Tx and in Rx mode. The LC character of the slots will be modified so as to obtain the bandwidth, the position of the band and the level of matching that are desired, the other parameters being modified in order to compensate for the mismatches created by the modification of the slots. Such a dimensioning operation results, in the detailed example, in the first slot being enlarged so as to merge with the stub of the first transition.

As a result, the following final dimensions are obtained:

| | |
|---|---|
| $a_{f1}$ = 5.32 mm | $b_{f1}$ = 3.556 mm |
| $e_{f1}$ = 0.5 mm | $e_{f2}$ = 0.5 mm |
| $a_{f2}$ = 8.43 mm | $b_{f2}$ = 1.65 mm |
| $L_G$ = 15 mm | $d_{cc}$ = 1.09 mm |
| $a_{t1}$ = 8.5 mm | $b_{t1}$ = 4.17 mm |
| $L_{t1}$ = 0.96 mm | $a_{t2}$ = 8.61 mm |
| $b_{t2}$ = 4.318 mm | $L_{t2}$ = 2.94 mm |
| $a_{t3}$ = 10.668 mm | $b_{t3}$ = 4.318 mm |
| $L_{t3}$ = 5.7 mm | $h_{tg1}$ = 6.56 mm |
| $L_{tg1}$ = 1.36 mm | $h_{tg2}$ = 6.81 mm |
| $L_{tg2}$ = 1.21 mm | $L_e$ = 3.42 mm |
| $h_{gc}$ = 1.48 mm | $L_i$ = 0.8 mm |
| $h_l$ = 1.29 mm | $a_{ff}$ = 7.112 mm |
| $L_{fe}$ = 2.03 mm | $h_{fe}$ = 3.556 mm |
| $L_{ft}$ = 2.7 mm | $h_{ft}$ = 1.86 mm |
| $h_{fgc}$ = 1.16 mm | $L_{fs}$ = 14.14 mm |
| $h_{fi}$ = 1.8 mm | $L_{fi}$ = 0.55 mm. |

At the end of the process, a set of components (slots, transitions and filters) that are dimensioned so as to be used in the frequency/polarization splitter is obtained. However, these components, taken individually, are not efficient in the desired frequency bands. A person skilled in the art may even notice that the specific characteristics of each component do not allow a priori the overall characteristics of the splitter to be obtained since their sum does not a priori allow the final characteristic of the splitter described to be obtained. However, the parasitic interaction of the various components does make it possible, by carrying out an overall dimensioning operation on the system, to achieve characteristics of a very high level.

The invention is not limited to the embodiment described. A person skilled in the art may change certain elements, while still following the same approach. The type of waveguide filter used may be replaced with any other type of waveguide filter. The square and rectangular waveguide cross sections may be replaced with circular and elliptical waveguide cross sections.

The invention claimed is:

1. Polarized-wave splitter, which comprises at least the following components:

- a common waveguide having a cross section suitable for letting at least two different polarizations propagate, the common waveguide having first and second ends, the first end constituting a common input/output;
- a first slot placed at the second end of the common waveguide, the first slot letting waves propagate with a first polarization;
- a second slot placed on a lateral part of the common waveguide, the second slot letting waves propagate with a second polarization;
- a first transition region providing a change in waveguide cross section;
- a second transition region providing a change in waveguide cross section;
- a first waveguide filter having a first end connected to the first slot via the first transition region, and a second end constituting a first individual input/output; and
- a second waveguide filter having a first end connected to the second slot via the second transition region, and a second end constituting a second individual input/output;

wherein the overall dimensions of the various components are such that the transfer characteristics of the splitter, within a transmit band and within a receive band, measured, on the one hand, between the common input/output and the first individual input/output and, on the other hand, between the common input/output and the second individual input/output, are better than the characteristics resulting from the sum of the characteristics of the components constituting the splitter, within the said bands.

2. Splitter according to claim 1, wherein the filters are symmetrical with respect to a mid-plane.

3. Splitter according to claim 1, wherein the components constituting the splitter are produced by moulding.

* * * * *